United States Patent
Schindler et al.

(10) Patent No.: US 7,074,875 B2
(45) Date of Patent: Jul. 11, 2006

(54) RTV-1 SILICONE ELASTOMER COMPOSITIONS WHICH CROSSLINK BY MEANS OF ALKOXY GROUPS

(75) Inventors: Wolfram Schindler, Tüssling (DE); Uwe Scheim, Coswig (DE); Bernd Pachaly, Mehring (DE)

(73) Assignee: Consortium fur elektrochemische Industrie GmbH, Munich (DE)

( * ) Notice: Subject to any disclaimer, the term of this patent is extended or adjusted under 35 U.S.C. 154(b) by 0 days.

(21) Appl. No.: 10/483,474

(22) PCT Filed: May 29, 2002

(86) PCT No.: PCT/EP02/05922

§ 371 (c)(1), (2), (4) Date: Jun. 30, 2004

(87) PCT Pub. No.: WO03/008485

PCT Pub. Date: Jan. 30, 2003

(65) Prior Publication Data

US 2004/0236056 A1 Nov. 25, 2004

(30) Foreign Application Priority Data

Jul. 17, 2001 (DE) .................. 101 34 634

(51) Int. Cl.
*C08G 77/26* (2006.01)
(52) U.S. Cl. .......................... 528/38; 528/25
(58) Field of Classification Search ............ 528/34, 528/38
See application file for complete search history.

(56) References Cited

U.S. PATENT DOCUMENTS 3,146,250 A  8/1964  Speier
5,118,777 A *  6/1992  Okawa .................. 528/34
5,254,657 A  10/1993  Inoue
6,534,615 B1 *  3/2003  Schafer et al. ............. 528/38

FOREIGN PATENT DOCUMENTS

| DE | 35 46 376 A1 | 7/1986 |
| DE | 4234846 A1 * | 4/1994 |
| EP | 0 559 045 B1 | 4/1996 |
| EP | 0 625 176 B1 | 12/1996 |

OTHER PUBLICATIONS

Derwent Abstract corresponding to EP 559045 [AN 1993-281925].
Derwent Abstract corresponding to DE 3546376 [AN 1986-125089].

* cited by examiner

*Primary Examiner*—Marc S Zimmer
(74) *Attorney, Agent, or Firm*—Brooks Kushman P.C.

(57) ABSTRACT

Crosslinkable RTV-1 compositions with enhanced physical properties include an alkoxy-functional polydiorganosiloxane having alkoxy-functional silyalkylene groups linked to a polydiorganosiloxane via ureaalkylene groups, prepared by reacting an α,ω-dihydroxyorganopolysiloxane with a silazane

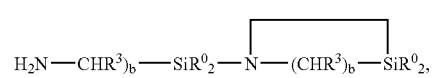

and with a silane of formula

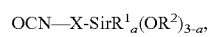

where $R^0$, $R^1$, $R^2$, and $R^3$ are optionally substituted hydrocarbon groups.

5 Claims, No Drawings

RTV-1 SILICONE ELASTOMER COMPOSITIONS WHICH CROSSLINK BY MEANS OF ALKOXY GROUPS

CROSS-REFERENCE TO RELATED APPLICATIONS

This application claims the benefit of PCT/EP02/05922 filed May 29. 2002 and German application 10134634.4 filed Jul. 17, 2001.

BACKGROUND OF THE INVENTION

1. Field of the Invention

The invention relates to compositions which can be crosslinked to give elastomers with elimination of alcohols from alkoxysilyl end groups.

2. Description of the Related Art

Single-component silicone rubber mixtures (RTV-1) which can be stored if water is excluded but vulcanized in the presence of water at room temperature to give elastomers are known. They generally comprise a polymeric, mostly linear siloxane, a compound with crosslinking action, which has to contain readily hydrolyzable groups, a plasticizer, which is mostly a methyl-terminated polydimethylsiloxane, and, where appropriate, other additives, such as curing catalysts, pigments, processing aids, and fillers. The vulcanization of the mixtures may take place under acidic conditions, e.g. in the presence of acetoxysilanes, under basic conditions, e.g. by means of aminosilanes, or under neutral conditions, e.g. by way of compounds which have oximo groups or have alkoxy groups. RTV-1 systems which crosslink under neutral conditions are needed especially when the cleavage products arising during the curing of the mixture cannot be permitted to affect the substrate, for example in the jointing of concrete or of metallic materials. In many applications, preference is given to systems which crosslink under neutral conditions because the odor of the elimination products is unpleasant in the acetoxy compositions and amine compositions. The oxime compositions here are increasingly being replaced by the corresponding alkoxy compositions, because of the toxicology of the cleavage products.

For formulating RTV-1 compositions, use is generally made of a polymer having OH end groups. The reaction of the crosslinking agent components with the OH polymer, the substances used for this purpose in the case of the alkoxy compositions being trialkoxyorganosilanes, can take place during the compounding process with the plasticizer and the other fillers. Since these compositions are mostly difficult to produce and are subject to restrictions with regard to mixing specifications (transparent compositions being mostly impossible to obtain), use is generally made of polymers which have been end-capped in advance by alkoxy end groups. Their preparation has been disclosed, by way of example, in EP-B-559 045, and generally takes place via reaction of a hydroxy-terminated polydiorganosiloxane of a particular viscosity with alkoxysilanes in the presence of catalysts. The desired polymer is formed during this condensation process (elimination of alcohol). The preparation of the alkoxy-terminated polymer is then followed by the preparation of the mixture, which can then take place as described above. However, a disadvantage with all of the processes described hitherto is that an adequate degree of conversion of the OH-end-group polymers is achieved only when using methoxysilanes. If the ethoxysilanes known hitherto are used to prepare the polymers, the conversion of the OH groups is incomplete. Because of this, curing of the compositions can occur before preparation of the RTV-1 mixtures has ended, or during the storage of the finished mixtures, and this means that the resultant products have inadequate storage stability.

Another method for preparing alkoxy-crosslinking polymers reacts functionalized polydiorganosiloxanes with an organofunctional alkoxysilane which has a functionality that can be reacted with that of the polydiorganosiloxane. Typical end groups of such polymers may be linear, branched, or, where appropriate, substituted hydroxyalkyl, aminoalkyl, or mercaptoalkyl groups. Suitable functionalities on organofunctional alkoxysilanes, likewise having linear, branched, or, where appropriate, substituted divalent alkyl groups, are isocyanate, epoxy, alkenyl, or anhydride groups. Preference is given here to hydroxy- and aminoalkylpolydiorganosilanes, which may likewise preferably be reacted with isocyanatoalkylsilanes in a simple and quantitative reaction.

EP-A-625 176 describes moisture-cured polymers for applications in antiadhesive coatings. These polymers are prepared by reacting $\alpha,\omega$-aminoalkylpolydimethylsiloxanes with an isocyanatoalkyltrialkoxysilane. The aminoalkylpolydimethylsiloxanes are prepared by equilibrating octamethylcyclotetrasiloxane with bis(3-aminopropyl)tetramethyldisiloxane. U.S. Pat. No. 5,254,657 describes appropriate compounds, including compounds for use in RTV-1 compositions. Here again, the compositions are produced by reacting an isocyanatoalkylalkoxysilane with aminoalkylfunctional polydimethylsiloxanes. The aminoalkylpolydimethylsiloxanes are likewise used in the form of equilibrated systems. A disadvantage of the processes described is that very long reaction times (above 10 hours) are generally needed for equilibration processes to prepare aminoalkylpolydiorganosiloxanes, mostly giving inhomogeneous polymers. A portion of the cyclosiloxanes mostly remains unreacted here, and moreover a portion of the added bis(3-aminopropyl)tetramethyldisiloxane does not become incorporated into the polymer. The resultant polymers therefore have an inhomogeneous and broad molecular weight distribution. The high residual content of from 10 to 20% of octamethylcyclotetrasiloxane in the equilibrated system generally has to be removed in vacuo by a complicated process. U.S. Pat. No. 5,254,657 omits this purification process, but this method is problematic in relation to the mechanical properties of these compositions and the bleed-out of low-molecular-weight constituents after application.

Finally, the catalyst in the equilibrated system also has to be adequately deactivated to prevent premature vulcanization of the polymers, for example during the incorporation of fillers in the compositions. Because the reaction conditions during the equilibration process and the deactivation of the catalyst are extreme (high-temperature heating of the polymer mostly being used), compositions of this type mostly have an amine-like odor, together with a yellow color.

U.S. Pat. No. 3,146,250 describes another process, not hitherto used industrially, for preparing aminoalkylpolydimethylsiloxanes, starting from specific cyclic silanes of the general formula (1), which can react with HO—Si groups at the end of a silicone chain.

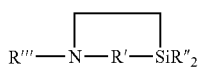
(1)

R' here is a carbon chain having at least 3 and at most 6 carbon atoms, R" is a hydrocarbon radical, and the radical R'" on the nitrogen is either hydrogen, a hydrocarbon radical, or an organosilyl radical of the general formula (halogen-R""—)$Y_2$Si—, where Y and R"" are hydrocarbon radicals. If the radical R'" is hydrogen, the result is an unsubstituted cyclic silazane which can be used to functionalize hydroxy-terminated silanols. The disadvantage of these unsubstituted cyclic silazanes is, however, that they can be synthesized only in very poor yields or from expensive starting materials. In these syntheses use is frequently made of the highly toxic compound allylamine, the use of which requires particularly stringent safety measures. The synthesis of N-substituted silazanes is of greater interest, the preparation of these frequently giving better yields. However, if use is made of the N-silyl-substituted silazane described in U.S. Pat. No. 3,146,250, a reaction with hydroxy-terminated siloxanes gives undesired by-products, such as those listed in the formula diagram below:

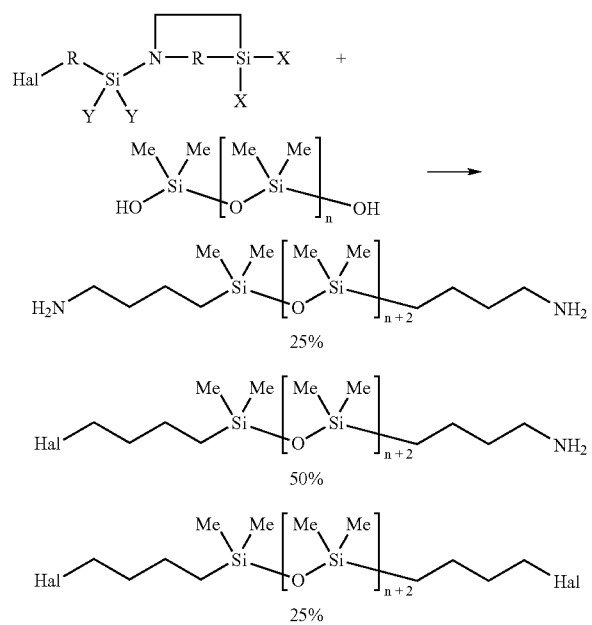

Y and X here are methyl, for example, and R is propyl, and Hal is halogen, for example chlorine. The respective proportions of the starting materials are derivable from simple probability calculations.

If use is made of the N-substituted silazanes of the general formula (2)

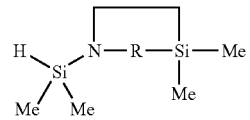
(2)

described in DE-A-3546376, where R is, by way of example, a propyl group, the result is likewise considerable amounts of undesired by-products, by analogy with the reaction described above (see above formula diagram).

SUMMARY OF THE INVENTION

The invention provides compositions which can be crosslinked to give elastomers with elimination of alcohols from alkoxysilyl end groups, and which comprise polydiorganosiloxane (A) of the general formula (3)

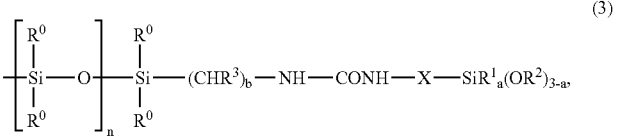
(3)

where the polydiorganosiloxane (A) is obtainable via reaction of a polydiorganosiloxane of the general formula (4)

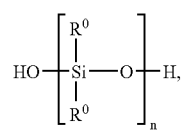
(4)

with a silazane of the general formula (5),

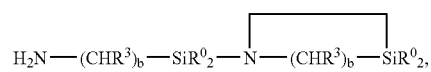
(5)

and with a silane of the general formula (6)

$$OCN-X-SiR^1_a(OR^2)_{3-a} \quad (6),$$

where $R^0$ is a monovalent $C_1$–$C_{20}$-hydrocarbon radical, unsubstituted or with substitution by fluorine groups, by chlorine groups, by bromine groups, by $C_1$–$C_4$-alkoxyalkyl groups, or by cyano groups, $R^1$, $R^2$ are a monovalent $C_1$–$C_6$-alkyl radical, unsubstituted or substituted by fluorine groups, by chlorine groups, by bromine groups, or by cyano groups, $R^3$ is hydrogen or an acyl radical or a monovalent $C_1$–$C_{20}$-hydrocarbon radical, unsubstituted or substituted by fluorine groups, by chlorine groups, by bromine groups, by $C_1$–$C_4$-alkoxyalkyl groups, or by cyano groups, X is an alkylene group, unsubstituted or substituted by fluorine groups, by chlorine groups, by bromine groups, by $C_1$–$C_4$-alkoxyalkyl groups, or by cyano groups, and having from 1 to 10 carbon atoms, which may have interruption by ether groups, by ester groups, or by amine groups, a is the value 0, 1, or 2, b is a whole-numbered value from 3 to 15, and n is a whole-numbered value from 10 to $10^4$.

The cyclic silazanes of the general formula (5) used in preparing polydiorganosiloxane (A) may be prepared simply and in high yields by the process described below.

This preparation route of polydiorganosiloxane (A) has been found to be particularly suitable for use in the present RTV-1 compositions. The resultant compositions have an excellent property profile and have not only controllably variable reactivity but also very good mechanical properties, excellent adhesion to various substrates, and very good weathering resistance. Particular features of the present compositions are low odor level and absence of color.

The silazane of the general formula (5) may be prepared by a process in which haloalkyldialkylchlorosilanes of the general formula (7)

(7)

or a bishaloalkyltetraalkyldisilazane of the general formula (8)

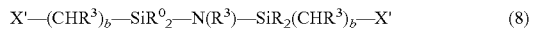

(8)

or a mixture of compounds of the general formulae (7) and (8), where

X' is Cl, Br, or I, and $R^3$ and R are as defined above, is/are reacted with ammonia, preferably under pressure.

n in the hydroxy-functional polydiorganosiloxanes of the general formula (4) is preferably whole-numbered values from 100 to 2000, in particular from 500 to 1200.

b in the cyclic silazanes of the general formula (5) is preferably the value 3, 4, 5, or 6, in particular 3. $R^3$ is preferably hydrogen. N-((3-aminopropyl)-dimethylsilyl)-2,2-dimethyl-1-aza-2-silacyclopentane is particularly preferred as silazane of the general formula (5).

In the isocyanatosilane of the general formula (6), X is preferably methylene or propylene, $R^1$ is preferably methyl, $R^2$ is preferably methyl or ethyl, and a is preferably 0 or 1.

Preferred silanes of the general formula (6) are isocyanatopropyltriethoxysilane, isocyanatopropyltrimethoxysilane, isocyanatopropylmethyldiethoxysilane, isocyanatopropylmethyldimethoxysilane, isocyanatomethyltrimethoxysilane, isocyanatomethyltriethoxysilane, isocyanatomethylmethyldiethoxysilane, isocyanatomethylmethyldimethoxysilane, isocyanatomethyldimethylmethoxysilane or isocyanatomethyldimethylethoxysilane.

$R^0$ in the general formulae (3) to (6) is preferably methyl, ethyl, phenyl, vinyl, or trifluoropropyl, in particular methyl.

The polydiorganosiloxane (A) is preferably prepared in two steps. In the first step, the polydiorganosiloxane of the general formula (4) is reacted with the silazane of the general formula (5) to give aminoalkylpolydiorganosiloxane of the general formula (9)

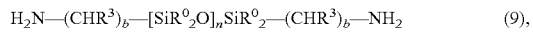

(9), where $R^0$, $R^3$, b, and n are as defined above. However, the silazane also reacts without producing by-products with hydroxy-functional polydiorganosiloxanes of the general formula (4), without the use of catalysts.

In the preparation of the aminoalkylpolydiorganosiloxanes, the amount of the silazane used of the general formula (5) depends on the amount of the silanol groups to be functionalized. However, if the intention is to achieve complete functionalization of the OH groups of a polydiorganosiloxane of the general formula (4) the amount of the silazane to be added is at least equimolar. If an excess of the cyclic silazane is used, the silazane not consumed in the reactions can then either be removed by distillation or be hydrolyzed (for example by adding methanol, or else water).

The first step above is preferably carried out at from 0° C. to 140° C., particularly preferably at from at least 20° C. to at most 100° C.

In the second step, the aminoalkylpolydiorganosiloxane of the general formula (9) is reacted with isocyanatosilane of the general formula (6) to give the polydiorganosiloxane of the general formula (3).

The isocyanatosilanes are used either individually or else as a mixture of various silanes. The choice of the silane here depends on the desired properties of the RTV-1 compositions finally obtained. In this context, it is possible to alter the reactivity and also the elastic properties. The corresponding methoxysilanes are more reactive than the ethoxysilanes. The compositions resulting from the difunctional silanes are generally of lower modulus than those resulting from the trifunctional silanes.

The conditions used in the second step are comparable with those used in the first step, the temperature preferably being identical.

The compositions which can be crosslinked to give elastomers with elimination of alcohols from alkoxysilyl end groups preferably comprise not only polydiorganosiloxane (A) but also a crosslinking catalyst (B), the aim being to achieve a higher crosslinking rate. Preference is given to amounts of from 0.01 to 5% by weight, based on the entire composition. Suitable crosslinking catalysts (B) are organic compounds of tin or of titanium, preferably dialkyltin compounds, e.g. dibutyltin dilaurate or dibutyltin diacetate, or titanium compounds, e.g. tetrabutyl or tetraisopropyl titanate, or titanium chelates. It is also possible to use catalyst mixtures.

The compositions which can be crosslinked to give elastomers with elimination of alcohols from alkoxysilyl end groups may also comprise other additives (C), such as fillers, plasticizers, adhesion promoters, or pigments.

Suitable other additives (C) in the RTV-1 mixture are:

Up to 40% by weight of plasticizers, preferably trimethylsilyl-terminated polydimethylsiloxanes with viscosities of from 0.05 to 10 Pas. Particular preference is given to viscosities of from 0.1 to 1 Pas. However, it is also possible to use methyl-terminated polydimethylsiloxanes in which some of the methyl groups have been replaced by other organic groups, such as phenyl, vinyl, or trifluoropropyl. Although it is particularly preferable to use linear trimethylsilyl-terminated polydimethylsiloxanes as plasticizers, it is also possible to use compounds which contain some branching, resulting from the presence of small amounts of tri- or tetrafunctional silanes in the starting materials used to prepare the plasticizers. However, it is also possible for the plasticizer used to comprise, in place of the siloxanes, up to 25% by weight, based on the entire composition, of other organic compounds, e.g. certain hydrocarbons free from aromatic compounds.

Up to 30% by weight of reinforcing fillers, and/or up to 60% by weight of non-reinforcing fillers, for achieving certain mechanical properties. Preferred fillers with high specific surface area are fumed silica or precipitated calcium carbonate. Use may moreover be made of fillers with a low specific surface area as extenders. Preference is given here to ground calcium carbonate.

Up to 5% by weight of adhesion promoters, preferably alkoxysilanes substituted by functional groups. Particular preference is given to 3-aminopropyltriethoxysilane, 3-(2-aminoethyl)aminopropyltriethoxysilane, and 3-mercaptopropyltriethoxysilane. It is also possible to use a mixture of alkoxysilanes substituted by functional groups.

Examples of other additives which may be used, depending on the intended application of the RTV-1 composition, are: color pigments, fungicides (in each case up to 2% by weight).

The crosslinkable compositions may, by way of example, be used as adhesives or sealants.

All of the above symbols in the above formulae have meanings independent of each of the other symbols.

In the examples below, all of the quantity and percent data are based on weight unless otherwise stated in a particular case, and all of the pressures are 0.10 Mpa (abs.), and all of the temperatures are 20° C.

EXAMPLES

Example 1

500 g of α,ω-dihydroxypolydimethylsiloxane with an average molar mass of 15,000 g/mol are heated in a heatable laboratory-scale planetary-gear mixer fitted with vacuum pump to 80° C., the heating continuing for 0.5 h in vacuo. At 80° C., 9.20 g of N-((3-aminopropyl)dimethylsilyl)-2,2-dimethyl-1-aza-2-silacyclopentane are added and reacted with vigorous stirring (butterfly stirrers, 300 rpm) for a period of 1.0 h. $^1$H NMR is used to check the conversion of the N-((3-aminopropyl)dimethylsilyl)-2,2-dimethyl-1-aza-2-silacyclopentane. 16.40 g of isocyanatopropyltrimethoxysilane are then added at 80° C., and stirring is continued for a further hour. IR spectroscopy is used to monitor the complete conversion of the silanes, using the NCO band.

The resultant silane-terminated polymer is cooled to 25° C., with stirring, and treated with 230.0 g of a trimethylsilyl-terminated polydimethylsiloxane with a viscosity of 100 Pas, 16.7 g of 3-(2-aminoethyl)aminopropyltrimethoxysilane, 85.0 g of a hydrophilic fumed silica, and processed within a period of 0.5 h to give a firm-consistency paste. Finally, 0.25 g of dibutyltin dilaurate is incorporated as catalyst over a period of 10 mm. A doctor blade is used to apply the paste with a layer thickness of 2 mm to a Teflon sheet, and the paste is crosslinked with exposure to atmospheric moisture to give a silicone rubber. The properties of this product are given in table 1.

Example 2

500 g of α,ω-dihydroxypolydimethylsiloxane with average molar mass of 45,000 g/mol are heated in a heatable laboratory-scale planetary-gear mixer fitted with vacuum pump to 80° C., the heating continuing for 0.5 h in vacuo. At 80° C., 3.07 g of N-((3-aminopropyl)dimethylsilyl)-2,2-dimethyl-1-aza-2-silacyclopentane are added and reacted with vigorous stirring (butterfly stirrers, 300 rpm) for a period of 1.0 h. $^1$H NMR is used to check the conversion of the N-((3-aminopropyl)dimethylsilyl)-2,2-dimethyl-1-aza-2-silacyclopentane. 5.47 g of isocyanatopropyltrimethoxysilane are then added at 80° C., and stirring is continued for a further hour. IR spectroscopy is used to monitor the complete conversion of the silanes, using the NCO band.

The resultant silane-terminated polymer is cooled to 25° C., with stirring, and treated with 230.0 g of a trimethylsilyl-terminated polydimethylsiloxane with a viscosity of 100 Pas, 16.7 g of 3-(2-aminoethyl)aminopropyltrimethoxysilane, 85.0 g of a hydrophilic fumed silica, and processed within a period of 0.5 h to give a firm-consistency paste. Finally, 0.25 g of dibutyltin dilaurate is incorporated as catalyst over a period of 10 min. A doctor blade is used to apply the paste with a layer thickness of 2 mm to a Teflon sheet, and the paste is crosslinked with exposure to atmospheric moisture to give a silicone rubber. The properties of this product are given in table 1.

Example 3

500 g of α,ω-dihydroxypolydimethylsiloxane with an average molar mass of 65,000 g/mol are heated in a heatable laboratory-scale planetary-gear mixer fitted with vacuum pump to 80° C., the heating continuing for 0.5 h in vacuo. At 80° C., 2.12 g of N-((3-aminopropyl)dimethylsilyl)-2,2-dimethyl-1-aza-2-silacyclopentane are added and reacted with vigorous stirring (butterfly stirrers, 300 rpm) for a period of 1.0 h. $^1$H NMR is used to check the conversion of the N-((3-aminopropyl)dimethylsilyl)-2,2-dimethyl-1-aza-2-silacyclopentane. 3.78 g of isocyanatopropyltrimethoxysilane are then added at 80° C., and stirring is continued for a further hour. IR spectroscopy is used to monitor the complete conversion of the silanes, using the NCO band.

The resultant silane-terminated polymer is cooled to 25° C., with stirring, and treated with 230.0 g of a trimethylsilyl-terminated polydimethylsiloxane with a viscosity of 100 Pas, 16.7 g of 3-(2-aminoethyl)aminopropyltrimethoxysilane, 85.0 g of a hydrophilic fumed silica, and processed within a period of 0.5 h to give a firm-consistency paste. Finally, 0.25 g of dibutyltin dilaurate is incorporated as catalyst over a period of 10 min. A doctor blade is used to apply the paste with a layer thickness of 2 mm to a Teflon sheet, and the paste is crosslinked with exposure to atmospheric moisture to give a silicone rubber. The properties of this product are given in table 1.

Example 4

500 g of α,ω-dihydroxypolydimethylsiloxane with average molar mass of 80,000 g/mol are heated in a heatable laboratory-scale planetary-gear mixer fitted with vacuum pump to 80° C., the heating continuing for 0.5 h in vacuo. At 80° C., 1.73 g of N-((3-aminopropyl)dimethylsilyl)-2,2-dimethyl-1-aza-2-silacyclopentane are added and reacted with vigorous stirring (butterfly stirrers, 300 rpm) for a period of 1.0 h. $^1$H NMR is used to check the conversion of the N-((3-aminopropyl)dimethylsilyl)-2,2-dimethyl-1-aza-2-silacyclopentane. 3.07 g of isocyanatopropyltrimethoxysilane are then added at 80° C., and stirring is continued for a further hour. IR spectroscopy is used to monitor the complete conversion of the silanes, using the NCO band.

The resultant silane-terminated polymer is cooled to 25° C., with stirring, and treated with 230.0 g of a trimethylsilyl-terminated polydimethylsiloxane with a viscosity of 100 Pas, 16.7 g of 3-(2-aminoethyl)aminopropyltrimethoxysilane, 85.0 g of a hydrophilic fumed silica, and processed within a period of 0.5 h to give a firm-consistency paste.

Finally, 0.25 g of dibutyltin dilaurate is incorporated as catalyst over a period of 10 min. A doctor blade is used to apply the paste with a layer thickness of 2 mm to a Teflon sheet, and the paste is crosslinked with exposure to atmospheric moisture to give a silicone rubber. The properties of this product are given in table 1.

Comparative Example 5

492.2 g of octamethyltetracyclosiloxane are treated with 7.8 g of bisaminopropyltetramethyldisiloxane and 300 ppm of tetrabutylphosphonium hydroxide in a one-liter three-necked flask under a blanket of nitrogen, and the mixture is heated to 120° C. and stirred for 10 h. After the reaction, the product is heated to 170° C. and the catalyst is deactivated for 30 min. This gives a colorless to pale yellowish polymer with an average molecular weight of 15,000. 16.40 g of isocyanatopropyltrimethoxysilane are then added at 80° C., and stirring is continued for a further hour. IR spectroscopy is used to monitor the complete conversion of the silane, using the NCO band.

The resultant silane-wrminated polymer is cooled to 25° C., with stirring, and treated with 230.0 g of a trimethylsilyl-terminated polydimethylsiloxane with a viscosity of 100 Pas, 16.7 g of 3-(2-aminoethyl)aminopropyltrimethoxysilane, 85.0 g of a hydrophilic fumed silica, and processed within a period of 0.5 h to give a firm-consistency paste. Finally, 0.25 g of dibutyltin dilaurate is incorporated as catalyst over a period of 10 min. A doctor blade is used to apply the paste with a layer thickness of 2 mm to a Teflon sheet, and the paste is crosslinked with exposure to atmospheric moisture to give a silicone rubber. The properties of this product are given in table 1.

TABLE 1

Properties of RTV-1 silicone rubber mixtures from examples 1–5.

| Property | Ex. 1 | Ex. 2 | Ex. 3 | Ex. 4 | Ex. 5* |
|---|---|---|---|---|---|
| Properties of silane-terminated polydiorganosiloxane | | | | | |
| Viscosity [Pas] | 2.0 | 35 | 60 | 84 | 1.2 |
| Color | Colorless, slightly cloudy | Colorless, clear | Colorless, clear | Colorless, clear | Pale yellowish, cloudy |
| Odor | Odorless | Odorless | Odorless | Odorless | Strong amine-like |
| Properties of cured silicone rubber (14 d, indoor atmosphere) | | | | | |
| Skinning [min] | 16 | 17 | 19 | 15 | 20 |
| Tensile strength [MPas], DIN 53504 | 1.21 | 1.49 | 1.55 | 1.72 | 0.96 |
| Tensile strain at break [%], DIN 53504 | 335 | 396 | 497 | 560 | 229 |
| Stress at 100% tensile strain [MPas], DIN 53504 | 0.36 | 0.48 | 0.44 | 0.38 | 0.42 |
| Hardness [Shore A], DIN 53505 | 20 | 18 | 16 | 17 | 22 |

*non-inventive

What is claimed is:

1. A process for preparing a polydiorganosiloxane (A) having the formula

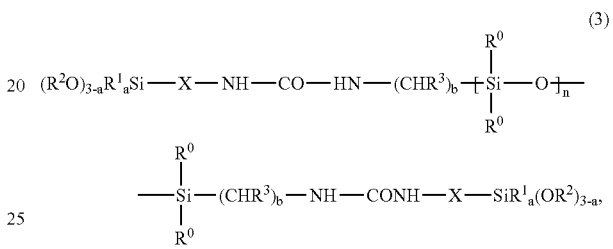

(3)

comprising
reacting a polydiorganosiloxane of the formula (4)

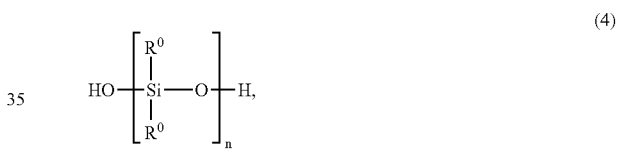

(4)

with a silazane of the general formula (5),

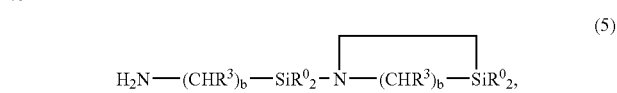

(5)

and with a silane of the formula (6)

$$OCN-X-SiR^1_a(OR^2)_{3-a} \qquad (6),$$

where
$R^0$ is a monovalent $C_1$–$C_{20}$-hydrocarbon radical unsubstituted or substituted by fluorine, chlorine, bromine, $C_1$–$C_4$-alkoxyalkyl, or cyano groups,
$R^1, R^2$ are a monovalent $C_1$–$C_6$-alkyl radical unsubstituted or substituted by fluorine, chlorine bromine, or cyano groups,
$R^3$ is hydrogen or an acyl radical or a monovalent $C_1$–$C_{20}$-hydrocarbon radical unsubstituted or substituted by fluorine, chlorine, bromine, $C_1$–$C_4$-alkoxyalkyl, or cyano groups,
X is an alkylene group unsubstituted or substituted by fluorine, chlorine, bromine, $C_1$–$C_4$-alkoxyalkyl, or cyano groups, and having from 1 to 10 carbon atoms, which may be interrupted by ether groups, by ester groups, or by amine groups,
a is 0, 1, or 2,
b is a whole-number from 3 to 15, and
n is a whole-number from 10 to $10^4$.

2. The process of claim 1, wherein the polydiorganosiloxane (A) is prepared in two steps, where in the first step the polydiorganosiloxane of the formula (4) is reacted with the silazane of the formula (5) to give aminoalkylpolydiorganosiloxane of the formula (9)

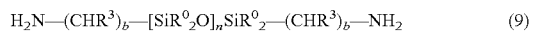
(9)

and in the second step the aminoalkylpolydiorganosiloxane of the formula (9) is reacted with isocyanatosilane of the formula (6) to give the polydiorganosiloxane of the formula (3).

3. The process of claim 1, wherein N-((3-aminopropyl)dimethylsilyl)-2,2-dimethyl-1-aza-2-silacyclopentane is used as a silazane of the formula (5).

4. The process of claim 1, wherein X is methylene in the silane of formula (6) or propylene.

5. The process of claim 1, wherein $R^o$ is methyl in the polydiorganosiloxane of formula (4).

* * * * *